(12) United States Patent
Plaquin et al.

(10) Patent No.: US 12,524,521 B2
(45) Date of Patent: Jan. 13, 2026

(54) DEVICES FOR VERIFYING THE INTEGRITY OF SOFTWARE

(71) Applicant: Hewlett-Packard Development Company, L.P., Spring, TX (US)

(72) Inventors: David Julien Plaquin, Bristol (GB); Christopher Ian Dalton, Bristol (GB); Pierre Louis Robert Belgarric, Bristol (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 141 days.

(21) Appl. No.: 18/255,979

(22) PCT Filed: Dec. 11, 2020

(86) PCT No.: PCT/US2020/064570
§ 371 (c)(1),
(2) Date: Jun. 5, 2023

(87) PCT Pub. No.: WO2022/125114
PCT Pub. Date: Jun. 16, 2022

(65) Prior Publication Data
US 2024/0045946 A1 Feb. 8, 2024

(51) Int. Cl.
*G06F 21/00* (2013.01)
*G06F 21/52* (2013.01)
(52) U.S. Cl.
CPC ........ *G06F 21/52* (2013.01); *G06F 2221/033* (2013.01)
(58) Field of Classification Search
CPC ............... G06F 21/52; G06F 2221/033; G06F 2221/2135; G06F 21/57; G06F 21/554
See application file for complete search history.

(56) References Cited

U.S. PATENT DOCUMENTS

| | | |
|---|---|---|
| 6,298,449 B1 | 10/2001 | Carter |
| 8,341,758 B2 | 12/2012 | Kim et al. |
| 9,721,093 B2 | 8/2017 | Poornachandran et al. |

(Continued)

FOREIGN PATENT DOCUMENTS

| | | |
|---|---|---|
| EP | 3614285 A1 | 2/2020 |
| WO | 2019/036795 A1 | 2/2019 |
| WO | 2019/133796 A1 | 7/2019 |

OTHER PUBLICATIONS

Liu, Hong. "Black-, grey-, and white-box side-channel programming for software integrity checking." PhD diss., Kansas State University, 2017. Available at: https://krex.k-state.edu/dspace/handle/2097/38232.

*Primary Examiner* — Ghazal B Shehni
(74) *Attorney, Agent, or Firm* — Quarles & Brady LLP

(57) ABSTRACT

A monitoring device for verifying the integrity of a software of a memory device is disclosed. The monitoring device comprises a processor and a memory, the memory containing instructions executable by the processor, such that the processor is to; receive first information on at least one physical side-effect of a computer apparatus as a result of an instruction of a monitored software being executed by the computing apparatus. The processor is also to receive second information on the monitored software being executed, and based on the first information and the second information, the processor is to determine if the monitored software is compromised.

21 Claims, 6 Drawing Sheets

(56) References Cited

U.S. PATENT DOCUMENTS

| | | | |
|---|---|---|---|
| 2003/0009687 A1* | 1/2003 | Ferchau | G06F 21/64 |
| | | | 713/176 |
| 2005/0132122 A1* | 6/2005 | Rozas | G06F 21/55 |
| | | | 711/100 |
| 2010/0192212 A1* | 7/2010 | Raleigh | G06Q 30/0207 |
| | | | 726/7 |
| 2013/0318607 A1* | 11/2013 | Reed | G06F 11/3093 |
| | | | 726/23 |
| 2015/0317475 A1* | 11/2015 | Aguayo Gonzalez | ........ |
| | | | G06F 21/755 |
| | | | 726/23 |
| 2016/0232354 A1* | 8/2016 | Fraser | G06F 21/554 |
| 2018/0012020 A1* | 1/2018 | Prvulovic | G06F 21/552 |
| 2019/0205535 A1 | 7/2019 | Gerhart | |

* cited by examiner

DEVICES FOR VERIFYING THE INTEGRITY OF SOFTWARE

BACKGROUND

A software comprises a set of instructions, or program, instructing a computer to perform a function. Software can be compromised by improper or inadequate software updates, and/or by malicious attacks where an unauthorized user changes or injects code into the software. This can result in the software not functioning correctly, which can have detrimental effects such as an unauthorized user accessing sensitive data or taking over control of the computer running the software.

BRIEF DESCRIPTION OF THE DRAWINGS

Various features of the present disclosure will be apparent from the detailed description which follows, taken in conjunction with the accompanying drawings, which together illustrate features of the present disclosure, and wherein.

DETAILED DESCRIPTION

Figure 1:
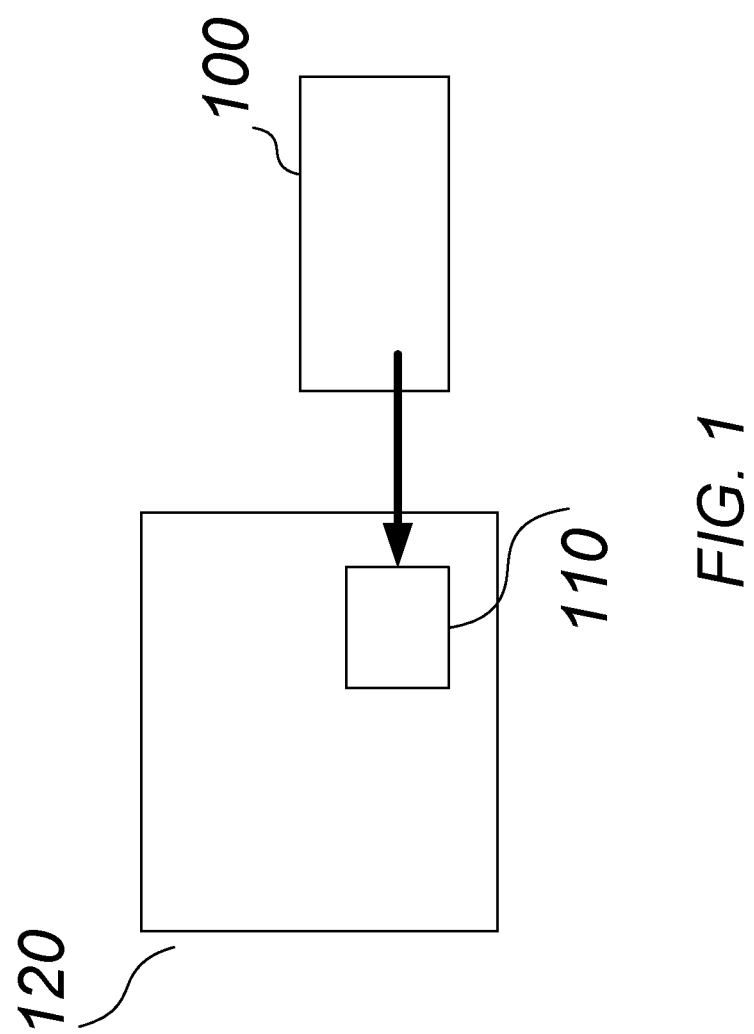
FIG. 1 shows a schematic representation of an example of a monitoring device, computing apparatus and memory device.

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

It is desirable for software users to be able to verify the integrity of the software so as to reduce the risks of the software being compromised. Software is typically vulnerable to attacks trying to manipulate the software to operate differently, typically to the detriment of the software users. For example, an attacker can substitute software code with malicious code, or inject malicious code into a software. They can do so unnoticed in between security checks of the software such that the main central processing unit (CPU) executes the compromised or unverified code.

It is also challenging to verify the integrity of the code or integrity of the control flow of a software that runs in a limited runtime environment with little or no access to hardware interfaces, for example early basic input/output systems (BIOS) code or hypervisors.

Certain examples disclosed herein may address the challenges of verifying the integrity of a software as it is being executed. Certain examples may provide a solution of verifying the integrity of a software wherein the software is continuously monitored. Certain examples may also provide a flexible solution in that software can be instrumented without the instrumentation having been verified prior to being implemented. This is because the instrumentation may become part of the behavior of the software being verified, which decreases the probability of a potential compromise of the software being undetected. Certain examples may also detect if protection policies of a software or hardware are correctly configured. Certain examples may also enable software, such as BIOS code or hypervisors, to be monitored.

As disclosed herein, the terms software and firmware may be considered to be interchangeable in the context of the examples provided. "Firmware" may be considered to be code or processor executable instructions that runs before OS execution, with a small portion which may continue after the OS bootloader executes (for example during a callback procedure). "Software" may be considered to be a broader term than firmware, and may be considered to refer to code or processor executable instructions that executes from the time the OS bootloader starts, through OS runtime, and until the computing apparatus is shut down. "Software" may also be considered to encompass any set of instructions executable by a processor regardless of the operating state of the computing apparatus.

As used herein, a Basic Input/Output System (BIOS) refers to hardware or hardware and instructions to initialize, control, or operate a computing apparatus prior to execution of an Operating System (OS) of the computing apparatus. Instructions within a BIOS may be software, firmware, microcode, or other programming that defines or controls functionality or operation of a BIOS. In one example, a BIOS may be implemented using instructions, such as platform firmware of a computing apparatus, executable by a processor. A BIOS may operate or execute prior to the execution of the OS of a computing apparatus. A BIOS may initialize, control, or operate components such as hardware components of a computing apparatus and may load or boot the OS of computing apparatus.

As used herein, control flow may be understood as the order in which instructions, logic or statements of a software are executed. It can also refer to the order in which hardware is engaged when a software is executed. When a software is run it is expected that it will execute instructions in accordance with a control flow. If a software deviates from the expected control flow, then that may indicate that the software has been compromised.

As used herein, a software being compromised may be understood as the software not behaving as expected. This can be a result of data structures within the software, that are used in determining the control flow of the software, having been unexpectedly changed, and/or the actual code of the software having been unexpectedly changed. The unexpected change can be as a result of an improper update of the software or an unauthorized change of the code of the software made by an attacker. In one example, if a software is not being compliant, not behaving as expected, and/or not following the expected control flow, then a software may be considered to be compromised.

As used herein, an instruction may be understood as referring to an order given to a computer processor by a computer program or software. It may also be understood to include any of the following, or a combination thereof; a write operation or loading data in a memory device, a read operation or fetching of data from a memory device, an order for loading a firmware of a memory device, and/or an order for controlling hardware other than the memory device.

As used herein, physical side-effects may be understood as referring to a measurement of side-channel or by-products that occur during operation of a computing apparatus. Examples of a physical side-effect can be power consumption, electromagnetic emission (EM), light emission and/or sound emission. It should be understood that these are examples and that other physical side effects can be used in the example configurations described below.

As used herein, a memory device is the memory which is associated with the monitored software, or the memory storing the monitored software. The memory device 110 may be a Flash memory, for example, a NOR Flash memory or a NAND Flash memory. The memory device 110 may be a volatile or a non-volatile memory. The memory device may be a RAM memory. The memory device may also be referred to as a storage or memory unit. In one example, the memory device is embedded on a platform of a computer. In another example, the memory device 110 is not embedded on a platform of a computer, it may then be considered to be external to the computer. In one example, the memory device is a flash memory that can be inserted into a receiving port of a computer such that the computer can access the content on the flash memory. In another example, the memory device is a Flash memory forming part of the computer, such as a BIOS chip.

For the purposes of this description, a computing apparatus comprises a computer having a central processing unit, CPU, and a memory device. The memory device may be embedded in the computer or it may be external to the computer but still form part of the computing apparatus.

Examples disclosed herein provide a monitoring device for verifying the integrity of a software of a memory device. The monitoring device comprising a processor and a memory. The memory contains instructions executable by the processor, such that the processor is to; receive first information on at least one physical side-effect of the computing apparatus as a result of an instruction of a monitored software being executed by a computing apparatus, receive second information on the monitored software being executed, and based on the first information and the second information, determine if the monitored software is compromised.

By the monitoring device observing the behavior of the software it can determine if the software is being compliant, in other words, whether it is behaving as expected.

Examples disclosed herein provide methods for verifying the integrity of a software. These methods may be performed by a monitoring device, or they can be computer-implemented methods. The methods comprise receiving first information on at least one physical side-effect of a computing apparatus as a result of an instruction of a monitored software being executed by said computing apparatus and receiving second information on the monitored software being executed. By using the first and the second information, the method further comprises determining if the monitored software follows an expected control flow when it is being executed.

Examples disclosed herein provide a non-transitory computer-readable medium comprising instructions that, when executed, cause a processor of a computing apparatus to: receive first information on at least one physical side-effect of a computing apparatus as a result of an instruction of a monitored software being executed by said computing apparatus, receive second information on the monitored software being executed, and based on the first information and the second information, determine if the monitored software is compromised.

FIG. 1 shows a schematic representation of an example of a monitoring device 100, computing apparatus 120 and a memory device 110. The monitoring device 100 is for verifying the integrity of a software of the memory device 110. The monitored software may be residing in the memory device 110 or it may be associated with the memory device 110. The memory device 110 may be a Flash memory, for example, a NOR Flash memory or a NAND Flash memory. The memory device 110 may be a volatile or a non-volatile memory. The memory device may be a RAM memory. The memory device may also be referred to as a storage or memory unit. In one example, the memory device 110 is embedded on a platform of a computer forming part of a computing apparatus 120 as illustrated in FIG. 1. In another example, the memory device 110 is not embedded on a platform of a computer, it may then be considered to be external to the computer but still forming part of the computing apparatus. In one example, the memory device is a flash memory that can be inserted into a receiving port of a computer such that the computer can access the content on the flash memory. In another example, the memory device 110 is a Flash memory forming part of a computer, such as a BIOS chip.

In another example the monitored software may be a firmware of the memory device 110 that is being executed by a CPU of the computing apparatus 120.

The monitoring device 100 monitors the software on the memory device 110 such that when the software is executed, the monitoring device 100 can infer if the instructions of the software that are being executed correspond to those that are expected. This can also be explained as the monitoring device 100 determines if the software follows the expected control flow. If the monitoring device 100 determines that the software does not follow the expected control flow, in other words, that an instruction being executed is not an expected instruction, then the monitoring device 100 determines that the software is compromised.

In one example, the monitoring device 110 determines if a software is compromised by observing a physical side-effect of the computing apparatus 120 when an instruction or set of instructions are executed and compares the observed physical side-effect with an expected physical side-effect. If the observed physical side-effect matches that of the expected physical side-effect, then it is indicated that the software is operating normally, if not, then it is implied that the software has been compromised.

To determine if the software is compromised, the monitoring device 110 also considers internal activities of the computing apparatus. An example of an internal activity that the monitoring device may consider is the timing of an instruction being executed, a timing between instructions, timing or content of a message being sent between components of the computing apparatus (including the memory), and/or timings of different phases of the execution of the software relative to the control flow.

Figure 2:
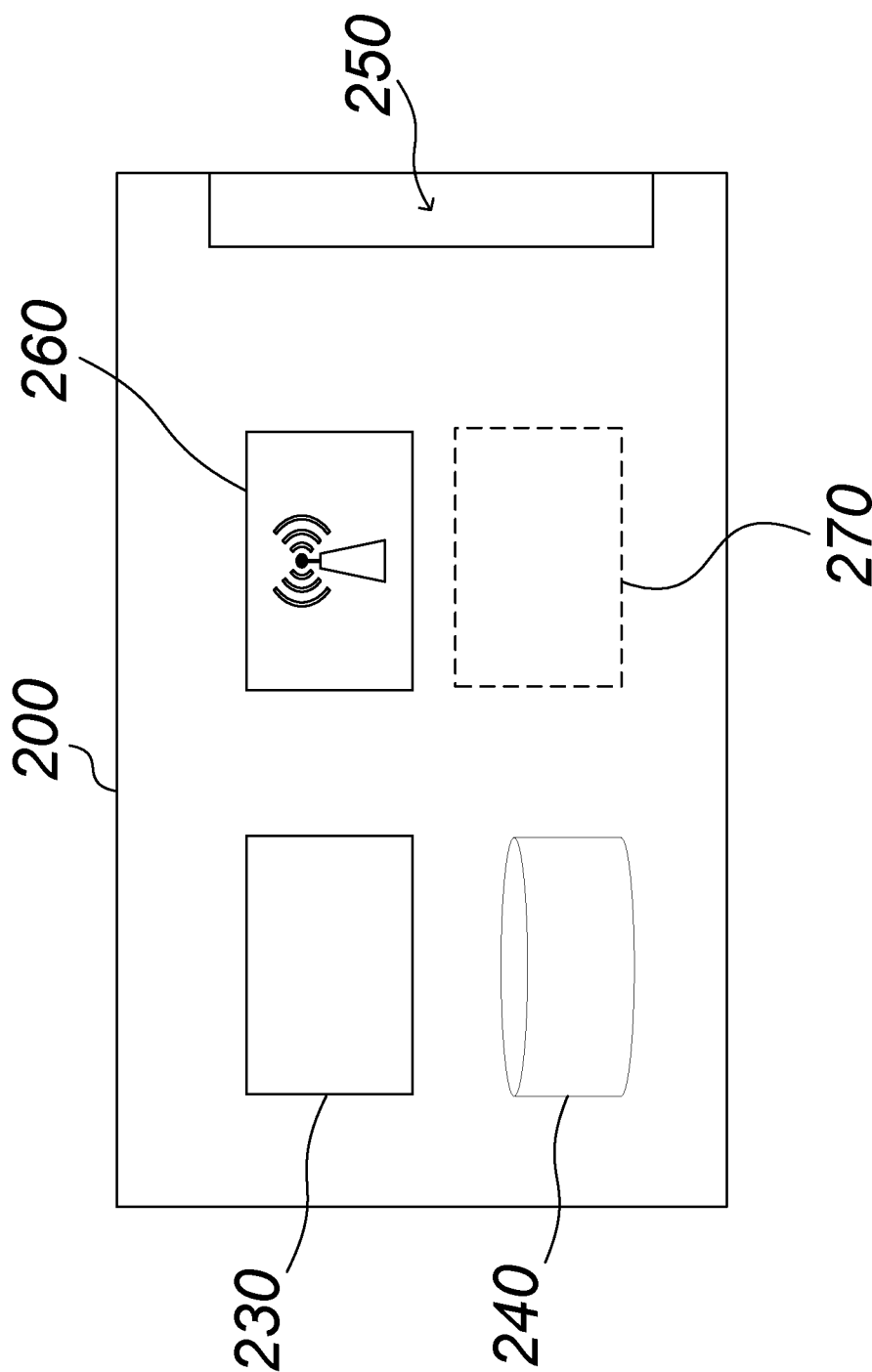
FIG. 2 is a schematic representation of an example of a monitoring device for verifying the integrity of a software.

FIG. 2 shows a schematic representation of an example of a monitoring device 200, where dashed lines indicate optional features. The monitoring device 200 comprises a processor 230, and a memory 240, the memory containing instructions executable by the processor 230. In one example, the monitoring device 200 also comprises a communication interface 250 for communicating with other components such as a computing apparatus, memories and hardware, or servers. In another example, the monitoring device 200 comprises a sensor unit 260 for detecting and/or measuring one or several physical side-effects of a computing apparatus. The sensor unit 260 may comprise a plurality of different sensors including any combination of power consumption sensor, electromagnetic emission sensor, audio emission sensor or light emission sensor. The sensor unit 260 is not limited to these sensors but can comprise any suitable sensor for detecting one or several physical side-effects. The sensor unit 260 may also comprise a probe or a detector for detecting a signal sent on a BUS of a computing apparatus. The signal may be corresponding to a read transaction sent on the BUS of a computing apparatus as the CPU fetches and executes firmware code of a memory device. In another example, the sensor unit 260 does not form part of the monitoring device 200, instead the sensor unit 260 may be already existing hardware on a computing apparatus. In such an example, the sensor 260 unit is for sending a measurement or detection to the monitoring device via the communication interface 250.

In one example, the monitoring device 200 may further comprise an analyzer 270. The analyzer 270 comprises a set of instructions that can either be stored in the memory 240 or another separate memory of the monitoring device 200. When the analyzer 270 is executed by the processor 230, the analyzer compares the measured or detected physical side-effect with existing data or data model defining an expected behavior of the software. By comparing, the analyzer may determine if the physical side-effect correspond to an expected physical side-effect. If a correspondence is determined, then it is indicative that the monitored software is executing instructions that correspond to the expected control flow. If the physical side-effect does not correspond to an expected physical side-effect, then this is indicative of that the monitored software does not comply with the control flow. The analyzer will then combine this result with detected internal activity of the computing apparatus as explained below so as to determine if the software is compromised. In another example, the analyzer may compare the measured or detected physical side-effect with existing data or data model to determine what type of instruction that is being executed. The analyzer may then use detected internal activity to determine if the instruction being executed is expected, and if the instruction being executed is not one that the internal activities indicate then it is determined that the software is compromised. This will be explained in more detail below.

In one example, the analyzer 270 comprises the data model. It may also comprise a policy. The data model describes the expected behavior of the monitored software in terms of expected physical side-effect and expected internal activities. The data model combines the measured and/or detected physical side-effects and internal activities of the computing apparatus, compares it with expected physical side-effect and internal activities to determine if the software is compromised. The data model may be a statistical data model obtained through machine learning and/or a heuristic data model developed using knowledge of the behavior of software being monitored.

The policy may comprise one or several directions/rules as to how much deviation from the data model that is acceptable before the monitored software is determined to be compromised, and what recovery actions to take if the deviation is unacceptable. Recovery actions may include to log an event, block the unexpected instruction from being fully executed, block the remaining instructions of the software from being executed, re-install a non-compromised version of the software, reset the software, and/or force a different boot path if the processor is to determine that the monitored software is compromised.

In one example, the processor 230 applies the data model of the analyzer 270 to the detected physical side-effect and the detected internal activities, and based on both these inputs, the processor determines whether the software has been compromised.

The analyzer 270 may apply the data model in such a way that when the analyzer is executed by the processor, the measurement of the physical side-effect is compared to a reference value, and if the measurement deviates from the reference value by a predetermined amount, then it may indicate that the software is compromised. For example, if the measurement is below a threshold value, above a threshold value, within a range, or outside of a range, then it may indicate that the software is compromised. The type of threshold value or range depends on the physical side-effect used and the type of data model employed.

In one example, the analyzer 270 is offloaded to a server such that the processor 230 sends the measurement/detection of the physical side-effect(s) and the internal activity(s), via the communication interface, to the server. The server then executes the analyzer 270, and then sends the result back to the monitoring device 200.

Examples of monitoring devices will now be described with reference to FIG. 3.

Figure 3:
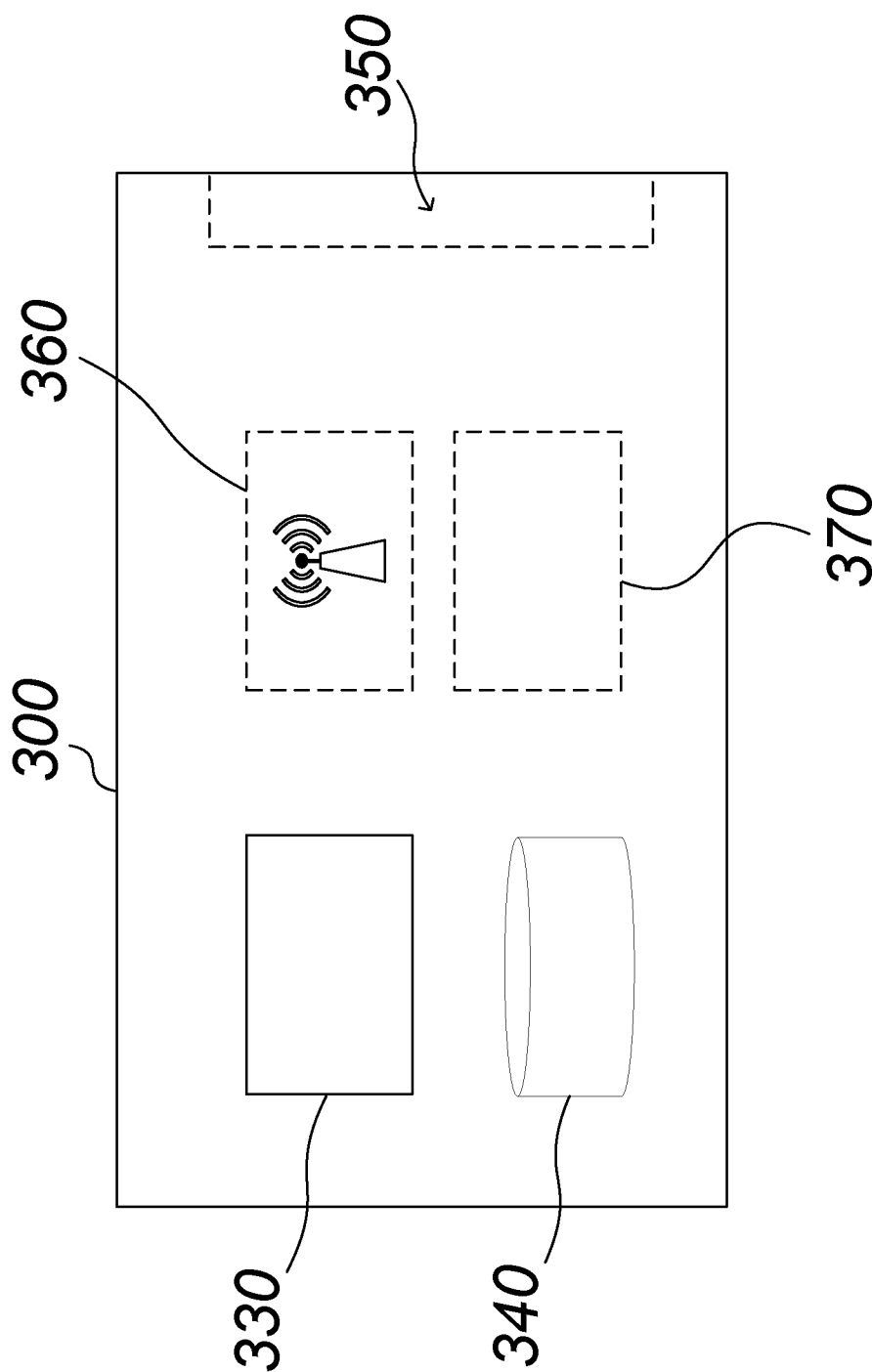
FIG. 3 is a schematic representation of an example of a monitoring device for verifying the integrity of a software.

FIG. 3 illustrates a schematic representation of an example of a monitoring device 300 for verifying the integrity of a software of a memory device, where dashed lines indicate optional features. The monitoring device 300 comprises a processor 330 and a memory 340. The memory 340 contains instructions executable by the processor 330 such that the processor is to receive first information on at least one physical side-effect of the computing apparatus as a result of an instruction of the monitored software being executed by a computing apparatus. The processor is further to receive second information on the monitored software being executed, and based on the first information and the second information, determine if the monitored software is compromised.

The processor 330 determining if the monitored software is compromised may also be described as determining if the monitored software behaves as expected, in other words if it is following the expected control flow.

The memory device storing or associated with the monitored software may be a Flash memory, for example, a NOR Flash memory or a NAND Flash memory. The memory device may be a volatile or a non-volatile memory. The memory device may be a RAM memory. The memory device may also be referred to as storage. In one example, the memory device is embedded on a platform of a computer forming part of the computing apparatus. In another example, the memory device is not embedded on a platform of a computer forming part of the computing apparatus, it may then be considered to be external to the computer but still part of the computing apparatus. In one example, the memory device is a flash memory that can be inserted into a receiving port of a computer such that the computer can access the content on the flash memory. In another example, the memory device is a Flash memory forming part of the computing apparatus, such as a BIOS chip.

An example of the first information may be at least one measurement of at least one physical side-effect such as power consumption, electromagnetic emission, light emission and/or sound emission.

In another example, the second information may also be at least one physical side-effect such as power consumption, electromagnetic emission, light emission and/or sound emission.

An example of the second information may be information relating to at least one internal activity of the computing apparatus. Examples of internal activities include; a timing of an instruction being executed, a timing between instructions, a timing or content of a message being sent between components of the computing apparatus, and/or a timing of different phases of the execution of the software relative to the control flow. Another example of an internal activity, and by so also second information, is data transmissions information on a BUS of the computing apparatus. The data transmission information may be at least one timing and/or at least one requested address of at least one read transaction. The data transmission information may be a result of firmware being executed during booting of the computing apparatus.

In another example of the monitoring device 300, the second information relates to the sequence of components of the computing apparatus being engaged as the monitored software is being executed.

In one example, the second information on the monitored software is to indicate whether the software is being updated, and the processor 330 is to compare the first information with a reference value to determine if a read or write instruction of the monitored software is being executed, and determine if the software is being updated based on the second information, and if it is determined that the software is not being updated and that a write instruction of the monitored software is being executed, then the processor 330 is to determine that the monitored software is compromised.

In another example, the computing apparatus comprises a central processing unit, CPU, and the first information comprises power consumption information of the memory, and the second information comprises a message received from a system management mode, SMM, software component of the CPU, wherein the message is indicating whether the monitored software is being updated, and the processor 330 of the monitoring device is to; compare the power consumption information with a reference value to determine if a read or write instruction of the monitored software is being executed, and determine if the monitored software is being updated based on the second information, and if it is determined that the software is not being updated and that a write instruction of the monitored software is being executed, then the processor is to determine that the monitored software is compromised.

In one example, the second information on the monitored software comprises data transmission information as a result of the instruction being executed, and the processor 330 of the monitoring device is to; compare the first information with a reference value to determine the type the instruction executed by the monitored software, compare the data transmission information with predetermined information relating to data transmission of an instruction expected in accordance with the control flow of the software, and based on the comparison, determine if the instruction is following an expected control flow.

In another example, the data transmission comprises at least one timing and/or at least one address of at least one read transaction transmitted on a BUS of the computing apparatus as a result of the monitored software being executed.

In one example, the software is a firmware of the memory device, and the computing apparatus comprises a central processing unit, CPU, and the first information comprises power consumption information of the memory, and the second information comprises at least one timing and/or at least one requested address of at least one read transaction on a BUS of the computing apparatus, the data transmission information being a result of the firmware being executed during booting of the computing apparatus, and the processor of the monitoring device is to; compare the first information and second information with expected reference values so as to determine that the execution of the firmware follows an expected control flow during booting of the computing apparatus.

In one example, the processor is to compare the first information with a reference value and if the information deviates from the reference value by a predetermined amount, the processor is to determine that the software is compromised.

The reference value may be defined by a data model describing expected behavior of the software when executed.

The data model may be a statistical data model and/or a heuristic data model.

In one example, an analyzer 370 comprises the data model. The analyzer may also comprise a policy.

In one example, the monitoring device 300 input the first and second information into the data model describing an expected behavior of the monitored software when executed, and the output of the model indicates whether the software has been compromised.

In one example, if the processor 330 has determined that the monitored software is compromised, then the processor will execute a recovery action. The recovery action may be any combination of; log an event, block the instruction from being fully executed, block the remaining instructions of the software from being executed, re-install a non-compromised version of the software, reset the software, and/or force a different boot path if the processor is to determine that the monitored software is compromised.

The monitoring device 300 may further comprise a sensor unit 360 to measure the physical side-effect of the computing apparatus whilst the instruction of the software that is being monitored is being executed, and the sensor unit 360 is to send information comprising the physical-side effect measured to the processor of the monitoring device.

The sensor unit 360 may further comprise a probe for detecting a timing and/or destination and/or source of a read transaction on a BUS of the computing apparatus.

In one example, the monitored software is a basic input/output system, BIOS, or a firmware.

In another example, the monitored software can be executed by a central processing unit of a computer or computer apparatus, or a processor of an external hardware device for a computer.

An example method with various options will now be described with reference to FIG. 4.

Figure 4:
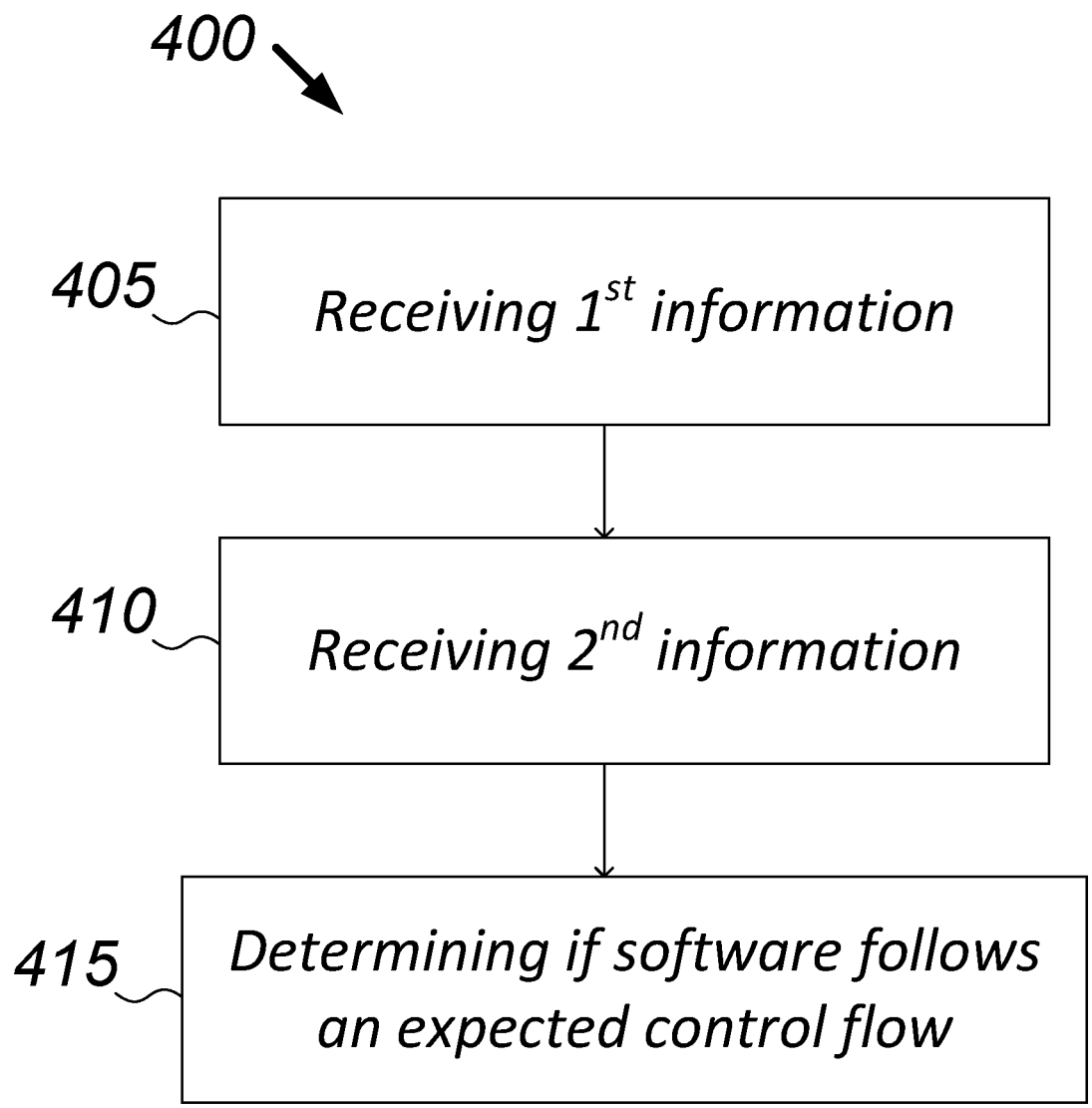
FIG. 4 illustrates an example flow chart of a method that may be computer-implemented or performed by a monitoring device.

FIG. 4 illustrates an example flow chart of a method 400 that may be computer-implemented or performed by a monitoring device. The method 400 is for verifying the integrity of a software. The method 400 comprising; receiving first information 405 on at least one physical side-effect of a computing apparatus as a result of an instruction of a monitored software being executed by said computing apparatus, receiving second information 410 on the monitored software being executed, and determining 415, based on the first information and the second information, if the monitored software follows an expected control flow when the monitored software is being executed.

In one example, the second information relates to a timing between instructions. In another example, the second information relates to the sequence of components of the computing apparatus being engaged as the monitored software is being executed.

In one example, the second information on the monitored software is to indicate whether the software is being updated, and the method may then comprise comparing the first information with a reference value to determine if a read or write instruction of the monitored software is being executed, and determining if the software is being updated based on the second information, and if it is determined that the software is not being updated and that a write instruction of the monitored software is being executed, then the method comprises determining that the monitored software is compromised.

In one example, the method relates to a computing apparatus comprising a central processing unit, CPU, and the first information comprising power consumption information of a memory device, and the second information comprising a message received from a system management mode, SMM, software component of the CPU, and wherein the message is indicating whether the monitored software is being updated, and the method further comprises; comparing the power consumption information with a reference value to determine if a read or write instruction of the monitored software is being executed, and determining if the monitored software is being updated based on the second information, and if it is determined that the software is not being updated and that a write instruction of the monitored software is being executed, then the method comprises determining that the monitored software is compromised.

In one example, the second information on the monitored software comprises data transmission information as a result of the instruction being executed, and the method further comprises comparing the first information with a reference value to determine the type of instruction executed by the monitored software, comparing the data transmission information with predetermined information relating to data transmission of an instruction expected in accordance with the control flow of the software, and based on the comparisons, determining if the instruction is following an expected control flow.

The data transmission may comprise at least one timing and/or address of a read transaction transmitted on a BUS of a computing apparatus as a result of the monitored software being executed.

In one example, the software is a firmware of a memory device, and the method further relates to a computing apparatus comprising a central processing unit, CPU, and the first information comprises power consumption information of the memory device, and the second information comprises at least one timing and/or at least one requested address of at least one read transaction on a BUS of the computing apparatus, the data transmission information being a result of the firmware being executed during booting of the computing apparatus, and the method further comprising comparing the first information and second information with expected reference values so as to determine that the execution of the firmware follows an expected control flow during booting of the computing apparatus.

In one example, the method further comprises comparing the first information with a reference value and if the information deviates from the reference value by a predetermined amount, the method further comprises determining that the software is compromised.

In one example, the method further comprises executing a recovery action if it is determined that the software is compromised. The recovery action may comprise to log an event, block the instruction from being fully executed, block the remaining instructions of the software from being executed, re-install a non-compromised version of the software, reset the software, and/or force a different boot path if the processor is to determine that the monitored software is compromised.

The method may further comprise measuring the at least one physical side-effect of the computing apparatus whilst the instruction of the software that is being monitored is being executed, and sending information comprising the at least one physical-side effect measured to a processor for executing the above described method. The method may further comprise detecting a timing and/or destination and/or source of a read transaction on a BUS of the computing apparatus and sending the detected information to a processor for executing the above-described method.

Examples of how the above-described monitoring devices and methods can be implemented will now be described with reference to FIG. 5.

Figure 5:
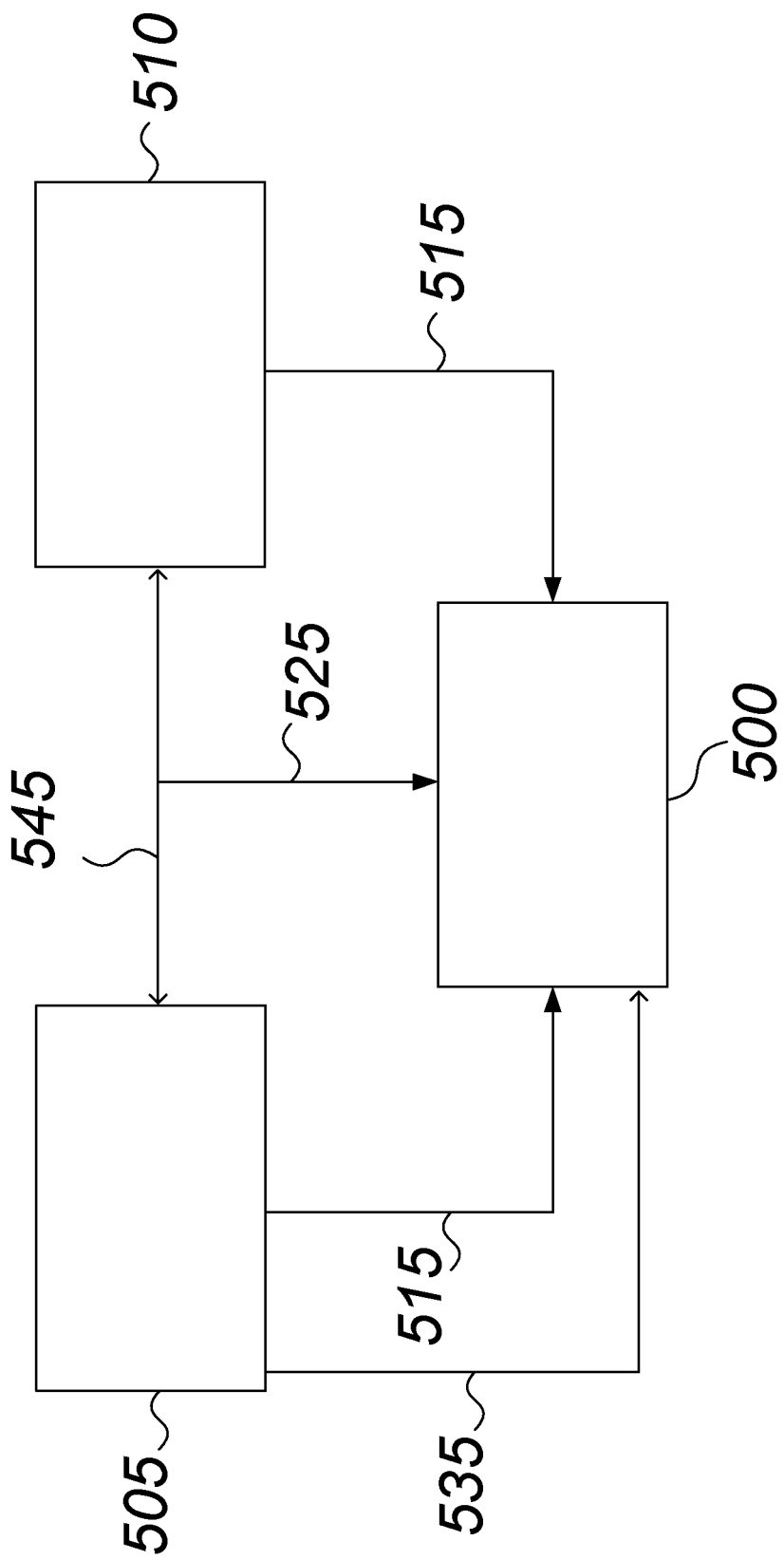
FIG. 5 illustrates a schematic representation of an example of a message flow between an example monitoring device, a CPU of an example computing apparatus and an example memory device.

FIG. 5 illustrates a schematic representation of an example of a message flow between a monitoring device 500, a CPU 505 of a computing apparatus and a memory device 510 of a computing apparatus, the memory device 510 may be a Flash memory. The CPU 505 and the memory device 510 may communication via a communication BUS 545 as illustrated in FIG. 5.

In this example, a software residing on the memory device 510 is being monitored by the monitoring device 500.

The monitoring device 500 is capable of receiving information (first information) on at least one physical side-effect 515 of the computing apparatus comprising the CPU 505. The monitoring device is also capable of receiving information (second information) on the internal activities 535 of the computing apparatus 505. In this example, the internal activity 535 is information on an update of the monitored software of the memory device 510 as will become apparent from the description below.

The monitoring device 500 measures the power consumed by the memory device 510 during normal operations using a sensor unit. The sensor unit may form part of the monitoring device 500 or the monitoring device may rely on a preexisting sensor unit of the computing apparatus that send measurements to the monitoring device 500.

The level of power consumption of a memory device differs between a read and a write operation, and so the monitoring device 500 can determine, based on the power consumption, an indication of whether the instruction that is being executed by the CPU 505 is a read or a write operation on the memory device 510. In other words, the monitoring device 500 can infer the type of instruction that is being executed by the CPU 505 in relation to the memory device 510.

On the CPU 505 of the computing apparatus 505, there is a system management mode (SMM) component that can communicate with the monitoring device 500. The SMM component has access to the memory device 510, and so the SMM component can send a message to the monitoring device 500 comprising an indication whether an update operation is in progress, in other words whether a write operation is being executed, on the memory device 510.

By combining the information on the type of instruction indicated by the power consumption of the memory device 510 with the information on whether the software on the memory device 510 is being updated, the monitoring device 500 can determine if the software is likely to have been compromised. This may be achieved by the monitoring device 500 applying a policy which states that a write operation on the memory device 500 can only occur if the SMM component has reported that an update operation is in progress. If this condition can be satisfied, the monitoring device 500 will determine that the monitored software is compliant and following its control flow. If the condition cannot be satisfied, the monitoring device will determine that the software has been compromised. The policy may then state what recovery action for the monitoring device to take, for example, log an event, block the instruction from being fully executed, block the remaining instructions of the software from being executed, and/or re-install a non-compromised version of the software.

In one example, the monitoring device 500 may also take into consideration information relating to data transmission 525 transmitted on the BUS 545 between the CPU 505 and the memory device 510 when determining if the software has been compromised. The information relating to data transmission may relate to the timing of an instruction being executed, timing(s) between instructions, timing or content of a message being sent between components of the computing apparatus, and/or timings of different phases of the execution of the software relative to the control flow.

Further examples of how the above-described monitoring devices and methods can be implemented will now be described with reference to FIG. 6.

Figure 6:
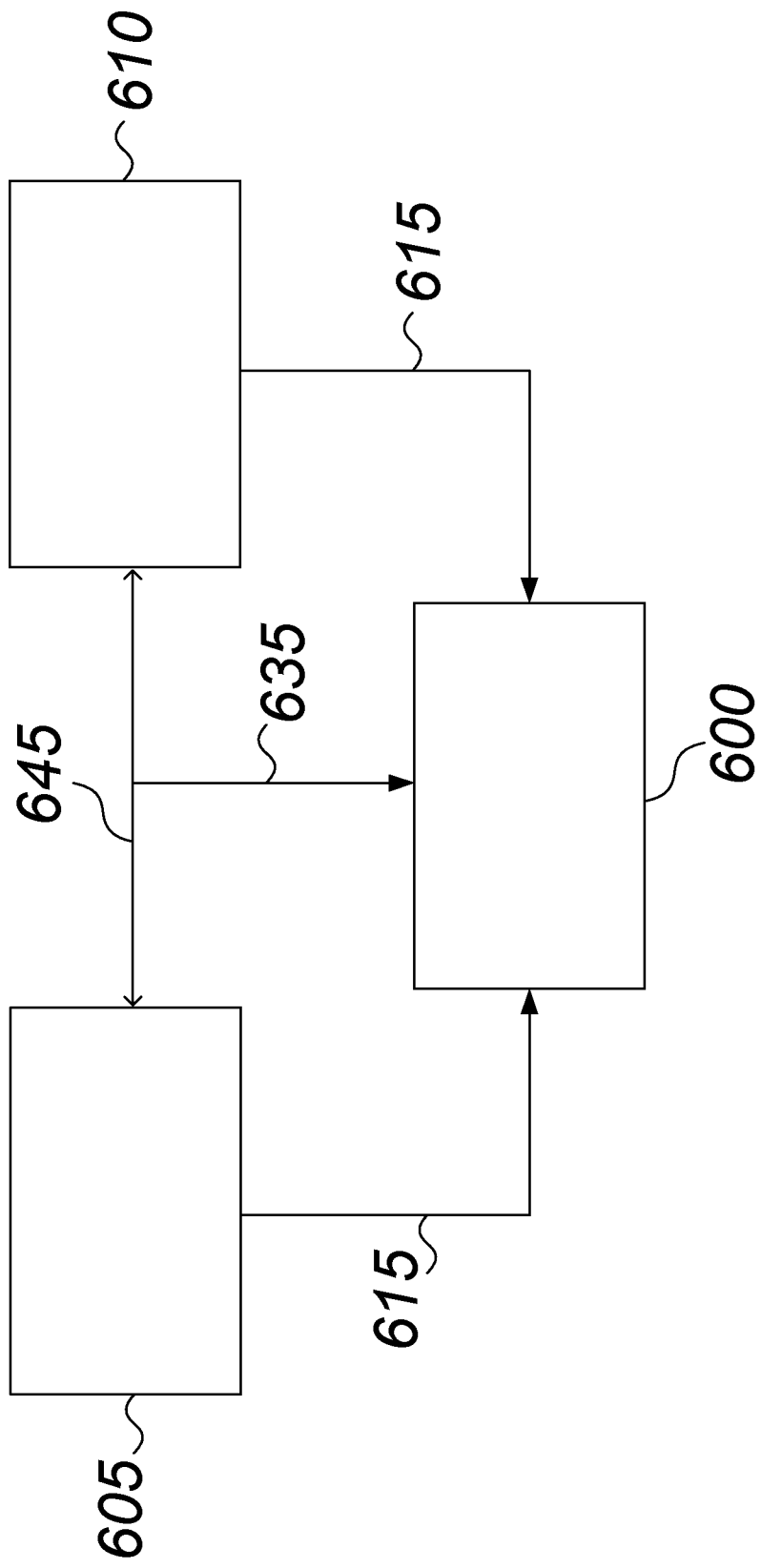
FIG. 6 illustrates a schematic representation of an example message flow between an example monitoring device, a CPU of an example computing apparatus and an example memory device.

FIG. 6 illustrates a schematic representation of an example message flow between a monitoring device 600, a CPU 605 of a computing apparatus and a memory device 610, which may be a Flash memory, also forming part of the computing apparatus. The CPU 605 and the memory device 610 may communicate via a communication BUS 645 as illustrated in FIG. 6.

In this example, a firmware of the memory device 610 is being monitored by the monitoring device 600 as it is being executed by the CPU 605 of the computing apparatus during boot operation.

The monitoring device 600 is capable of receiving 615 information (first information) on at least one physical side-effect of the computing apparatus. The monitoring device is also capable of receiving information (second information) on at least one internal activity(s) 635 of the computing apparatus. In this example, the internal activity 635 is information on data transmission along the BUS 645 of the computing apparatus as will become apparent from the description below.

The monitoring device 600 receives a measurement of the power consumption (first information) of the memory device 610 during a boot operation of the computing apparatus. Due to the operations performed by the micro-architecture of the controller of the memory device 610, some slight variations in the power consumption can be linked to the various internal operations such as computing raws and columns based on block address, handling missed cache, or CRC computation.

The monitoring device 600 also receives information 635 on data transmission sent on the BUS 645 of the computing apparatus. The data transmission is a result of the CPU 605 of the computing apparatus fetching and executing the firmware code from the memory device 610 which produces various read transactions on the BUS 645. The read transactions have patterns relating to timing(s) and/or requested addresses which is highly dependent on the instruction being executed.

The CPU 605 may also send information to the monitoring device 600 about the current stage of the boot process to help differentiate broadly between different expected behaviors.

The monitoring device 600 then applies an analyzer comprising a data model to verify that the observed power consumption and timing(s) of data transmission relating to the CPU fetching and executing the firmware correspond to an expected behavior of the firmware.

In one example, the monitoring device 600 receives several measurements of the power consumption of the memory device 610 during boot operation, and also receives information on several read transactions, such that the monitoring device 600 can verify that the observed patterns of power consumption and timings of data transmission relating to the CPU fetching and executing the firmware follow a succession of expected states within an acceptable range as defined by the data model and its associated policy.

In one example, the data model may be a statistical model, and there may be a data model for each of the boot stages.

If the observed behavioral patterns are outside of the acceptable range defined by the policy, the monitoring device 600 will determine the appropriate recovery actions. Recovery actions may include to log an event, block the unexpected instruction from being fully executed, block the remaining instructions of the software from being executed, re-install a non-compromised version of the firmware, reset the firmware, and/or force a different boot path if the processor is to determine that the monitored firmware is compromised.

Also disclosed herein is a non-transitory computer readable storage medium having executable instructions stored thereon, which, when executed by a processor, cause the processor to: receive first information on at least one physical side-effect of a computing apparatus as a result of an instruction of a monitored software being executed by said computing apparatus, receive second information on the monitored software being executed, and based on the first information and the second information, determine if the monitored software is compromised.

In other examples, the non-transitory computer-readable storage medium may comprise program code to perform any of the methods discussed herein. An example non-transitory computer-readable storage medium may be the memory 240, 340 shown in FIGS. 2 and/or 3.

Examples discussed herein may provide solutions for verifying the integrity of a software as it is being executed. By observing the physical behavior of a computing apparatus when a software of a memory device is being executed by a CPU of the computing apparatus, the behavior of the software can be determined and if it is behaving as expected.

The present teachings are not restricted to the details of any foregoing examples. Any novel combination of the features disclosed in this specification (including any accompanying claims, abstract, and drawings) may be envisaged. The claims should not be construed to cover merely the foregoing examples, but also any variants which fall within the scope of the claims.

The following numbered clauses also form a part of this disclosure:

Clause 1. A monitoring device for verifying the integrity of a software of a memory device, the monitoring device comprising a processor and a memory, the memory containing instructions executable by the processor, such that the processor is to; receive first information on at least one physical side-effect of a computer apparatus as a result of an instruction of a monitored software being executed by the computing apparatus, receive second information on the monitored software being executed, and based on the first information and the second information, determine if the monitored software is compromised.

Clause 2. The monitoring device according to clause 1, wherein the processor is to determine if the monitored software has been compromised by, based on the first and second information, determining if the software follows an expected control flow.

Clause 3. The monitoring device according to clause 1 or 2, wherein the second information relates to at least one timing between instructions.

Clause 4. The monitoring device according to clause 1 or 2, wherein the second information relates to a sequence of components of the computing apparatus being engaged as the monitored software is being executed.

Clause 5. The monitoring device according to clause 1 or 2, wherein the second information on the monitored software is to indicate whether the software is being updated, and the processor is to; compare the first information with a reference value to determine if a read or write instruction of the monitored software is being executed, and determine if the software is being updated based on the second information, and if it is determined that the monitored software is not being updated and that a write instruction of the monitored software is being executed, then the processor is to determine that the monitored software is compromised.

Clause 6. The monitoring device according to clause 1, wherein the computing apparatus comprises a central processing unit, CPU, and the first information comprises power consumption information of the memory device, and the second information comprises a message received from a system management mode, SMM, software component of the CPU, wherein the message is indicating whether the monitored software is being updated, and the processor of the monitoring device is to; compare the power consumption information with a reference value to determine if a read or write instruction of the monitored software is being executed, and determine if the monitored software is being updated based on the second information, and if it is determined that the monitored software is not being updated and that a write instruction of the monitored software is being executed, then the processor is to determine that the monitored software is compromised.

Clause 7. The monitoring device according to clause 1 or 2, wherein the second information (635) on the monitored software comprises data transmission information as a result of the instruction being executed, and the processor of the monitoring device is to; compare the first information with a reference value to determine the type the instruction executed by the monitored software, compare the data transmission information with predetermined information relating to data transmission of an instruction expected in accordance with the control flow of the software, and based on the comparison, determine if the instruction is following an expected control flow.

Clause 8. The monitoring device according to clause 7, wherein the data transmission comprises a timing and/or address of a read transaction transmitted on a BUS of the computing apparatus as a result of the monitored software being executed.

Clause 9. The monitoring device according to clause 1, wherein the software is a firmware stored on the memory device, and the computing apparatus comprises a central processing unit, CPU, and the first information comprises power consumption information of the memory device, and the second information comprises at least one timing and/or at least one requested address of a read transaction on a BUS of the computing apparatus, the data transmission information being a result of the firmware being executed during booting of the computing apparatus, and the processor of the monitoring device is to; compare the first information and second information with expected reference values so as to determine that the execution of the firmware follows an expected control flow during booting of the computing apparatus.

Clause 10. The monitoring device according to any of clause 1 to 9, wherein the processor is to; compare the first information with a reference value and if the information deviates from the reference value by a predetermined amount, the processor is to determine that the software is compromised.

Clause 11. The monitoring device according to any of clause 1 to 10, if the processor has determined that the monitored software is compromised, then the processor will execute a recovery action.

Clause 12. The monitoring device according to any of clause 1 to 11, further comprising a sensor unit to measure the at least one physical side-effect of the computing apparatus whilst the instruction of the monitored software is being executed, and the sensor unit is to send information comprising the physical-side effect measured to the processor of the monitoring device.

Clause 13. The monitoring device according to clause 12, wherein the sensor unit further comprises a sensor for detecting a timing and/or destination and/or source of a read transaction on a BUS of the computing apparatus.

Clause 14. A method for verifying the integrity of a software, the method comprising receiving first information on at least one physical side-effect of a computing apparatus as a result of an instruction of a monitored software being executed by said computing apparatus, receiving second information on the monitored software being executed, and determining based on the first information and the second information, if the monitored software follows an expected control flow when the monitored software is being executed.

Clause 15. A non-transitory computer-readable medium comprising instructions that, when executed, cause a processor of a computing apparatus to: receive first information on at least one physical side-effect of a computing apparatus as a result of an instruction of a monitored software being executed by said computing apparatus, receive second information on the monitored software being executed, and based on the first information and the second information, determine if the monitored software is compromised.

The invention claimed is:

1. A monitoring device comprising:
a processor coupled to a memory device, the memory device containing instructions that, when executed by the processor, cause the processor to:
monitor, during execution of an instruction of a monitored software, processing performed by a computing apparatus in executing the instruction;
acquire, in response to monitoring the processing:
i) physical side-effect data associated with a measurable by-product of the processing, and
ii) internal activity data indicative of an internal operation of the computing apparatus during the execution; and
determine, in response to comparing the physical side-effect data and the internal activity data with expected reference values, whether execution of the monitored software follows an expected control flow during booting of the computing apparatus.

2. The monitoring device according to claim 1, wherein the processor determines the monitored software to be compromised in response to detecting, from the physical side-effect data and the internal activity data, at least one of:
 (a) an alteration of a control flow of the monitored software,
 (b) an execution of an unauthorized instruction,
 (c) an unauthorized modification of the monitored software, or
 (d) an execution of the monitored software outside of an expected operational context.

3. The monitoring device according to claim 1, wherein the measurable by-product is a physical side-effect selected from the group consisting of:
 (a) power consumption of the computing apparatus;
 (b) electromagnetic radiation emitted by the computing apparatus;
 (c) light emission from the computing apparatus; and
 (d) sound emission from the computing apparatus.

4. The monitoring device according to claim 1, wherein the processor is to determine, in response to concluding that the physical side-effect data deviates from a reference value by at least a predetermined amount, compromise of the monitored software.

5. The monitoring device according to claim 1, wherein the internal activity data indicates whether the computing apparatus is updating the monitored software.

6. The monitoring device according to claim 1, wherein the internal operation is an internal activity selected from the group consisting of:
 (a) a timing between instructions executed by the computing apparatus;
 (b) a timing between different phases of execution of the monitored software;
 (c) a timing or content of a message from a system management mode (SMM) software component indicating whether the monitored software is being updated;
 (d) a timing of a read transaction on a bus of the computing apparatus;
 (e) a requested address of the read transaction on the bus of the computing apparatus;
 (f) a sequence of engagement of components of the computing apparatus during the execution of the monitored software; and
 (g) a timing or content of a message exchanged between components of the computing apparatus.

7. The monitoring device according to claim 1, wherein the monitored software is firmware stored on the memory device.

8. The monitoring device according to claim 7, wherein the computing apparatus generates data transmission information during execution of the firmware.

9. The monitoring device according to claim 8, wherein the computing apparatus generates the data transmission information while booting the computing apparatus.

10. The monitoring device according to claim 8, wherein the internal activity data comprises the data transmission information, the data transmission information resulting from the execution of the instruction from the monitored software.

11. The monitoring device according to claim 8, wherein the data transmission information comprises a timing and/or an address of a read transaction transmitted on a bus of the computing apparatus as a result of the monitored software being executed.

12. The monitoring device according to claim 1, wherein the expected control flow comprises a predefined sequence and timing of operations, instructions, and system states of the monitored software determined from uncompromised execution of the monitored software.

13. The monitoring device according to claim 1, wherein the instructions cause the processor to execute, in response to determining that the monitored software is compromised, a recovery action.

14. The monitoring device according to claim 1, further comprising:
 a sensor unit to send, in response to measuring the by-product of the processing, the physical side-effect data.

15. The monitoring device according to claim 14, wherein the sensor unit further comprises a sensor to detect a timing and/or a destination and/or a source of a read transaction on a bus of the computing apparatus.

16. The monitoring device according to claim 1, wherein the processor is to:
 determine whether the monitored software is being updated during execution of a read or write instruction of the monitored software.

17. The monitoring device according to claim 16, wherein in response to determining that the computing apparatus is executing a write instruction and that the monitored software is not being updated, the processor is to:
 determine that the monitored software is compromised.

18. The monitoring device according to claim 16, wherein the processor is to:
 determine, based on the internal activity data, whether the computing apparatus is updating the read or write instruction of the monitored software.

19. The monitoring device according to claim 16, wherein the processor is to:
 determine, in response to comparing a reference value with power consumption information included in the physical side-effect data, whether the computing apparatus is updating the read or write instruction of the monitored software.

20. A method comprising:
 monitoring by a processor, during execution of an instruction of a monitored software, processing performed by a computing apparatus in executing the instruction;
 acquiring by the processor, in response to monitoring the processing:
  i) physical side-effect data associated with a measurable by-product of the processing, and
  ii) internal activity data indicative of an internal operation of the computing apparatus during the execution; and
 determining by the processor, based on the physical side-effect data and the internal activity data, whether the monitored software is compromised.

21. A non-transitory computer-readable medium comprising instructions that, when executed, by a processor of a computing apparatus, cause the processor to:
 monitor, during execution of an instruction of a monitored software, processing performed by the computing apparatus in executing the instruction;
 acquire, in response to monitoring the processing:
  i) physical side-effect data associated with a measurable by-product of the processing, and ii) internal activity data indicative of an internal operation of the computing apparatus during the execution; and determine, based on the physical side-effect data and the internal activity data, whether the monitored software is compromised.

* * * * *